United States Patent [19]
Fukuzawa et al.

[11] Patent Number: 4,749,778
[45] Date of Patent: Jun. 7, 1988

[54] 2-CYANOACRYLATE-CARBONATE COMPOSITION

[75] Inventors: Minoru Fukuzawa, Shiga; Eisuke Hirakawa, Kyoto, both of Japan

[73] Assignee: Kabushiki Kaisha Alpha Giken, Osaka, Japan

[21] Appl. No.: 943,400

[22] Filed: Dec. 19, 1986

[30] Foreign Application Priority Data

Dec. 27, 1985 [JP] Japan ................................ 60-296994

[51] Int. Cl.$^4$ ............................................ C08G 63/62
[52] U.S. Cl. .................... 528/362; 526/285; 526/298; 526/312; 526/314; 528/370; 528/392
[58] Field of Search ............... 528/362, 370, 392; 526/314, 285, 298, 312

[56] References Cited

U.S. PATENT DOCUMENTS

| | | | |
|---|---|---|---|
| 3,280,078 | 10/1966 | Hostettler et al. | 528/362 |
| 3,961,966 | 6/1976 | Brinkmann et al. | 106/36 |
| 4,378,457 | 3/1983 | Gruber et al. | 528/362 |
| 4,421,909 | 12/1983 | Gruber et al. | 528/362 |

FOREIGN PATENT DOCUMENTS 115676 6/1985 Japan .
1365195 8/1974 United Kingdom .

Primary Examiner—Harold D. Anderson
Attorney, Agent, or Firm—Armstrong, Nikaido, Marmelstein & Kubovcik

[57] ABSTRACT

A 2-cyanoacrylate composition which comprises (A) a 2-cyanoacrylate compound and (B) a carbonate compound selected from the group consisting of dialkyl carbonates, alkylene carbonates, alkyne carbonates, alkylene glycol bisalkyl carbonates and trihydric alcohol trisalkyl carbonates.

8 Claims, No Drawings

2-CYANOACRYLATE-CARBONATE COMPOSITION

BACKGROUND OF THE INVENTION

This invention relates to a 2-cyanoacrylate composition useful as an adhesive (inclusive of a tacky adhesive), among others.

2-Cyanoacrylate compounds are well known as instantaneous cure adhesives for industrial and household use. They have a rapidly curing property and, when applied to a great variety of adherends, can produce potent adhesive force. For wider use thereof in a greater number of fields, however, cost reduction and free controllability of curing rate and/or adhesive strength depending on the intended use are still prerequisites.

For cost reduction, curing rate adjustment or adhesive strength adjustment, a number of proposals have been made so far which comprise incorporating an organic solvent and/or a plasticizer in said compounds. Thus, for instance, an organic solvent for dilution is used in combination with dioxane (Japanese Patent Publication No. 23811/74), a lactone is added (Japanese Patent Publication No. 46471/82), a plasticizer and a carboxylic acid are added (Japanese Patent Application Kokai No. 115836/77), or a plasticizer is used in combination with a vinyl chloride-vinyl acetate copolymer (Japanese Patent Application Kokai No. 166361/85).

However, the incorporation of an organic solvent in 2-cyanoacrylate compounds disadvantageously leads to reduced storage stability and decreased adhesive performance capability of 2-cyanoacrylate-based adhesive compositions and further to impairment of working environments. The incorporation of a plasticizer is also disadvantageous in that it causes decrease in instantaneous adhesion property of the resultant compositions after a long-term storage.

If 2-cyanoacrylate compounds could be made up into relatively slow cure tacky adhesive compositions, namely adhesive compositions initially having sticky property and rather gradually undergoing cure after application until final complete cure and adhesion, the range of application of 2-cyanoacrylate compounds would expectedly be much enlarged. However, it has been impossible to prepare such slow cure tacky compositions since the quality of instantaneous cure is intrinsic of 2-cyanoacrylate compounds.

The present invention has been completed in the course of intensive investigations by the present inventors of a large number of additives in search of ones with which the above problems encountered in the prior art might possibly be solved.

It is an object of the invention to provide a novel composition comprising a 2-cyanoacrylate compound and a carbonate compound.

Another object of the invention is to provide an instantaneous cure adhesive comprising the above composition.

A further object of the invention is to provide a slow cure tacky adhesive comprising the above composition.

SUMMARY OF THE INVENTION

The 2-cyanoacrylate composition according to the invention comprises (A) a 2-cyanoacrylate compound and (B) a carbonate compound selected from the group consisting of dialkyl carbonates, alkylene carbonates, alkyne carbonates, alkylene glycol bisalkyl carbonates and trihydric alcohol trisalkyl carbonates.

The present invention is described hereinbelow in more detail.

DETAILED DESCRIPTION OF THE INVENTION

The cyanoacrylate compound (A) to be used in the practice of the invention includes those compounds which are represented by the formulas

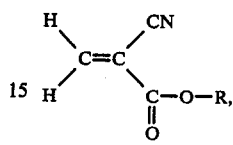

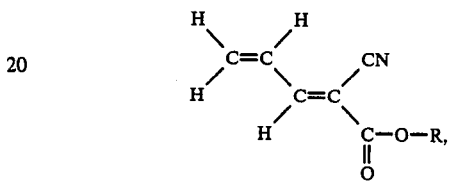

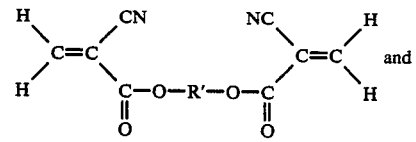

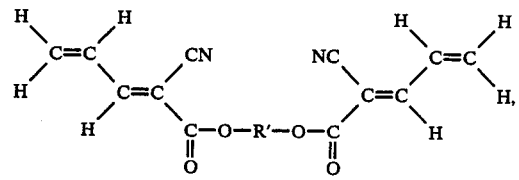

wherein R is an alkyl, alkenyl, alkynyl, cycloalkyl, aryl, alkoxyalkyl, alkoxycarbonylalkyl or tetrahydrofurfuryl group or the like and R' is an alkylene group. Examples are methyl 2-cyanoacrylate, ethyl 2-cyanoacrylate, propyl 2-cyanoacrylate, butyl 2-cyanoacrylate, allyl 2-cyanoacrylate, methoxyethyl 2-cyanoacrylate, ethoxyethyl 2-cyanoacrylate, 2-chloroethyl 2-cyanoacrylate, cyclohexyl 2-cyanoacrylate, ethoxycarbonylmethyl 2-cyanoacrylate, trifluoroethyl 2-cyanoacrylate, 1-cyano-1-carbomethoxybutadiene-1,3, 1-cyano-1-carboethoxybutadiene-1,3, 1-cyano-1-carboisobutoxybutadiene-1,3, ethylene glycol bis(2-cyanoacrylate), trans-2-butene-1,4-diol bis(2-cyanoacrylate), 2,5-hexanediol bis(2-cyanoacrylate), ethylene glycol bis(1-cyano-1,3-butadiene-1-carboxylate), propylene glycol bis(1-cyano-1,3-butadiene-1-carboxylate) and diethylene glycol bis(1-cyano-1,3-butadiene-1-carboxylate).

The carbonate compound (B) is selected from the group consisting of dialkyl carbonates, alkylene carbonates, alkyne carbonates, alkylene glycol bisalkyl carbonates and trihydric alcohol trisalkyl carbonates.

Said dialkyl carbonates are carbonates having two alkyl groups (inclusive of not only alkyl groups in the strict sense but also alkyl groups in a broader sense which include alkenyl groups, aryl groups and aralkyl groups as well; the same shall apply hereunder), which may be the same or different. Thus the dialkyl carbonates include, among others, dimethyl carbonate, diethyl carbonate, dipropyl carbonate, dibutyl carbonate, dihexyl carbonate, dioctyl carbonate, diallyl carbonate, dibenzyl carbonate, diphenyl carbonate, methyl ethyl carbonate, methyl propyl carbonate, methyl butyl carbonate, methyl allyl carbonate, methyl benzyl carbonate, methyl phenyl carbonate, ethyl propyl carbonate, ethyl butyl carbonate, ethyl allyl carbonate, ethyl benzyl carbonate, ethyl phenyl carbonate, butyl allyl carbonate, butyl benzyl carbonate and butyl phenyl carbonate.

The alkylene carbonates include ethylene carbonates, propylene carbonate, cyclohexene carbonate and tetramethylethylene carbonate, among others.

The alkyne carbonates include acetylene carbonate (i.e. vinylene carbonate), pentyne carbonate and butyne carbonate, among others.

The alkylene glycol bisalkyl carbonates are bisalkyl carbonates derived from diols such as ethylene glycol, diethylene glycol, triethylene glycol, propylene glycol, dipropylene glycol, 1,3-propanediol, 1,4-butanediol, 1,3-butanediol, 2,3-butanediol, neopentyl glycol and 2-ethyl-1,3-hexanediol, the alkyl group being methyl, ethyl, propyl, butyl, hexyl, octyl, allyl, benzyl or phenyl, for instance.

The trihydric alcohol trisalkyl carbonates are trisalkyl carbonates derived from triols such as glycerol, trimethylolethane and trimethylolpropane, the alkyl group being methyl, ethyl, propyl, butyl, hexyl, octyl, allyl, benzyl or phenyl, for instance.

These carbonates compounds (B) may be used either singly or in admixture of two or more.

The most important among the carbonate compounds (B) is ethylene carbonate.

When used in combination with the 2-cyanoacrylate compounds (A), these carbonate compounds (B) produce variegated effects, such as adhesive strength adjusting, cure promoting and tackifying effects, depending on the addition level. Furthermore, diluting effect, extending effect and polymer dissolving effect are also produced.

Alkyl chlorocarbonates can never produce such effects as are producible with the above carbonate compounds although they can be used as stabilizers for improving storage stability.

The 2-cyanoacarylate composition according to the invention is particularly useful as an adhesive. It has been found that, in this case, when the proportion of the carbonate compound (B) relative to the 2-cyanoacrylate compound (A) is below a certain limit, the composition serves as an adhesive of the instantaneous cure type but that when said proportion exceeds said certain limit, said composition unexpectedly behaves as an adhesive of the tacky type (an adhesive which, when applied, has tacky property initially but then rather gradually undergoes curing until adhesion is complete).

When the composition according to the invention is to be used as an adhesive, the proportion of the carbonate compound (B) should be selected generally within the range of 0.01-70% by weight, preferably within the range of 0.5-65% by weight, based on the sum total of the 2-cyanoacrylate compound (A) and the carbonate compound (B).

When the composition according to the invention is to be used as an adhesive of the instantaneous cure type, the proportion of the carbonate compound (B) should desirably be selected within the range of 0.01 to about 35% by weight, preferably within the range of 0.5-30% by weight, based on the sum total of the 2-cyanoacrylate compound (A) and the carbonate compound (B). At an addition level below said range, the carbonate compound (B) cannot produce satisfactory modifier effects. Conversely, at higher addition levels than the above range, tackiness is produced as will be mentioned hereinbelow and the composition becomes more suited for use as a slow cure tacky adhesive.

When the composition according to the invention is to be used as a slow cure tacky adhesive, the proportion of the carbonate compound (B) should desirably be selected within the range of about 25-70% by weight, preferably 30-65% by weight, based on the sum total of the 2-cyanoacrylate compound (A) and the carbonate compound (B). When the proportion of the carbonate compound (B) is smaller than the above range, the composition will be poor in tackiness and therefore should be used as an instantaneous cure adhesive. Conversely, when said proportion exceeds the above range, the final adhesive strength obtainable after adhesion operation will be insufficient.

In the foregoing description, the composition according to the invention has been classified either as an instantaneous cure adhesive or as a slow cure tacky adhesive according to whether the proportion of the carbonate compound (B) is below or above 30±5% by weight based on the sum total of the 2-cyanoacrylate compound (A) and the carbonate compound (B), respectively. In practice, however, this boundary (30±5%) is not a strict one but the instantaneous cure adhesive region proceeds to the tacky adhesive region continuously.

The 2-cyanoacrylate composition according to the invention can be used not only as an adhesive as mentioned above but also as a coating composition, a glazing agent (to provide the surface of glass or ceramic wares and so forth with an embossed figure), etc. Furthermore, the composition can be used in producing shaped products such as fibers or films by polymerizing the 2-cyanoacrylate compound (A) contained in the composition. For use in such fields of application other than the adhesive filed, the proportion of the carbonate compound (B) should be selected generally within the range of 0.01-70% by weight, preferably within the range of 0.5-65% weight, based on the sum total of the 2-cyanoacrylate compound (A) and the carbonate compound (B).

The compostion according to the invention which comprises a 2-cyanoacrylate compound (A) and a carbonate compound (B) may further contain, as necessary, such additives as stabilizers, organic solvents, plasticizers thickening agents, fillers, heat stabilizers and colorants.

Said stabiliziers include, among others, sulfur dioxide sulfur trioxide, nitrogen oxide, carbon dioxide, sulfonic acids, hydroquinone, hydroquinone monomethyl ether, trimethyldihydroquinone, t-butylcatechol, pyrocatechol, pyrogallol, p-methoxyphenol, sultones and alkyl sulfites.

Said organic solvents include, among others, hydrocarbons (e.g. benzene, toluene, xylene, ethylbenzene, tetralin, cumene, p-cymene), ketones (e.g. acetone, methyl ethyl ketone, acetophenone), ethers (e.g. dioxane, tetrahydrofuran, anisole, dioctyl ether, decyl butyl ether), esters (e.g. acetate esters, lactate esters, benzoate esters, cyanoacetate esters), acetoacetonitrile, vinyl esters (e.g. vinyl acetate), acetoaoetate esters, vinyl esters (e.g. vinyl acetate), compounds (e.g. nitromethane, nitroethane, nitrobenzene), lactones (e.g. propiolactone, pivalolactone, γ-butyrolactone, heptodilactone, dimethylheptodilactone), acrylate esters, methacrylate esters, chlorine-containing compounds (e.g. chlorobenzene, dichlorobenzene, triclene) and fluorine-containing compounds (e.g. trichlorotrifluoroethane)

Said plasticizers include, among others, phthalate esters (e.g. dibutyl phthalate, dioctyl phthalate, diallyl phthalate, butyl benzyl phthalate), phosphate esters (e.g. tricresyl phosphate, diphenyl cresyl phosphate, trichloroethyl phosphate, butyl benzyl phosphate, dibutyl phosphate), adipate esters (e.g. dibutyl adipate, dioctyl adipate), sebacate esters (e.g. dimethyl sebacate, dibutyl sebacate, dioctyl sebacate), benzoate esters (e.g. dipropylene glycol dibenzoate, neopentyl glycol dibenzoate, glycerol tribenzoate, pentaerythritol tetrabenzoate), oxalate esters, fumarate esters and itaconate esters.

Said thickening agents include, among others, polycyanoacrylate, polymethacrylates, polyacrylates, acrylonitrile-butadiene copolymers, acrylonitrilebutadiene-styrene copolymers, methacrylate-butadienestyrene copolymers, acrylate-acrylonitrile copolymers, polyvinyl acetate, ethylene-vinyl acetate copolymers and nitrocellulose.

Said fillers include, among others, carbon black, red iron oxide, calcium silicate, titanium oxide, calcium carbonate, clay, talc, metal powders, fibers and foils.

The adherends to which the composition according to the invention is applicable as an adhesive include, among others, paper sheets, leathers, wood products, fibers, fibrous products, "tatami" facings, mattings other knitted or woven products, filaments, filament bundles, metals, inorganic materials, plastics, rubbers, painted surfaces, and living bodies or tissues.

As has already been mentioned hereinabove, the composition according to the invention serves as an adhesive of the instantaneous cure type when the proportion of the carbonate compound (B) relative to the 2-cyanoacrylate compound (A) is below a certain limit while said composition unexpectedly behaves as an adhesive of the tacky type when said proportion exceeds said limit.

The carbonate compound (B) in the composition also contributes to adjustment of adhesive strength, promotion of curing, dilution of the system, improvement in solubility of the thickener polymer.

In accordance with the invention, the adhesive strength and rate of curing can be varied at will by selecting the level of addition of the carbonate compound (B) relative to the 2-cyanoacrylate compound (A), so that the range of application of the 2-cyanoacrylate compound (A) can be extended and expanded and various requirements can be met.

Even the incorporation of the carbonate compound (B) will not cause decrease in storage stability of the composition.

When the level of addition of the carbonate compound (B) is below a certain limit, there can be found a tendency toward shortening of the setting time, while the setting time as measured initially can be maintained for a prolonged storage period.

The 2-cyanoacrylate compound (A) can be made up into an adhesive of the tacky type by increasing the level of addition of the carbonate compound (B), whereby the range of application of the 2-cyanoacrylate compound (A) can be widened still more.

Furthermore, irrespective of whether the composition should be used in the mode of an adhesive or a tacky adhesive, incorporation of a relatively large amount of the carbonate compound (B) makes the composition soft, whereby even when the composition is used for adhesion of soft and flexible adherends such as cloths, it will not render such adherends too rigid.

Even when the carbonate compound (B) is incorporated for the purpose of increasing the viscosity of the 2-cyanoacrylate compound (A) by dissolving a polymer, the use of the carbonate compound (B) markedly increases the solubility of the polymer. Therefore, the polymer which is usable can be selected from a widened range of polymers and, moreover, such polymer can be incorporated in large amounts.

The carbonate compound (B) generally has no odor or only a slight fruit-like odor and can be handled with ease.

Since the composition according to the invention is prepared by incorporating the carbonate compound (B), which is inexpensive, in the 2-cyanoacrylate compound (A), which is expensive, without any substantial impairment of the performance characteristics as compared with the system comprising the 2-cyanoacrylate compound (A) alone, the cost of the composition can be reduced remarkably, so that the composition can be used also in those fields in which the use thereof has been restricted because of expensiveness.

EXAMPLES

The following examples are further illustrative of the present invention.

The measurements were conducted under the following conditions:

Setting time: The method described in JIS K 6861 was employed using cold-rolled steel sheets 25×100×1.6 mm in size. In the examples given in Table 4, the measurement was also conducted for the case in which an ethylene-propylene-diene rubber was used.

Tensile shear strength: Polished an degreased cold-rolled steel sheets 25×100×1.6 mm in size were used. Two such sheets were adhered together over a contact area of 12.5×25 mm and, after 24 hours of curing, subjected to measurement on a tensile tester.

Stability: Each composition was filled in a 20-ml polyethylene container and, after storage at 90° C. for 5 days in a sealed state, submitted to observation. Examples 1–11 and Reference Example 1

Ethylene carbonate was added, in various proportions, to ethyl 2-cyanoacrylate containing a small amount of sulfur dioxide (stabilizer). When the mixture was shaken for blending, the ethylene carbonate was endothermically dissolved in the ethyl 2-cyanoacrylate smoothly and there was obtained a homogeneous solution. The conditions used and the results obtained are shown in Table 1.

For comparison, the results obtained in the case of omission of the incorporation of ethylene carbonate are also shown in Table 1 on the line for Reference Example 1.

TABLE 1

|  | Compound (A) | Compound (B) | Setting time (sec) | Tensile shear strength ($kg/cm^2$) | Stability (90° C., 5 days) |
| --- | --- | --- | --- | --- | --- |
| Reference Example 1 | ECA 100 | — | 7–10 | 90 | Good |
| Example 1 | ECA 99.5 | EC 0.5 | 7–10 | 93 | Good |
| Example 2 | ECA 99.0 | EC 1.0 | 5–7 | 94 | Good |
| Example 3 | ECA 97.5 | EC 2.5 | 5–7 | 84 | Good |
| Example 4 | ECA 95.0 | EC 5.0 | 3–5 | 71 | Good |
| Example 5 | ECA 92.5 | EC 7.5 | 3–5 | 90 | Good |
| Example 6 | ECA 80.0 | EC 20.0 | 2–3 | 95 | Good |
| Example 7 | ECA 70.0 | EC 30.0 | 2–3 | 72 | Good |

TABLE 1-continued

|  | Compound (A) | Compound (B) | Setting time (sec) | Tensile shear strength (kg/cm²) | Stability (90° C., 5 days) |
|---|---|---|---|---|---|
| Example 8 | ECA 60.0 | EC 40.0 | 2-3 | 39 | Good |
| Example 9 | ECA 50.0 | EC 50.0 | 15-20 | 40 | Good |
| Example 10 | ECA 40.0 | EC 60.0 | 5 min. | 15 | Good |
| Example 11 | ECA 30.0 | EC 70.0 | 10 min. | 15 | Good |

Note
1: ECA stands for ethyl 2-cyanoacrylate.
2: EC stands for ethylene carbonate.
3: The setting time and tensile shear strength were measured in the Fe face-to-Fe face mode.
4: The numerical values given under "Compound (A)" and "Compound (B)" indicate the mixing proportions (percent by weight).

EXAMPLES 12-20 AND REFERENCE EXAMPLE 1

Various carbonate compounds were incorporated, in various amounts, in ethyl 2-cyanoacrylate containing a small amount of sulfur dioxide (stabilizer). The conditions used and results obtained are shown in Table 2.

For comparison, the results of Reference Example 1 are shown again in Table 2.

TABLE 2

|  | Compound (A) | Compound (B) | Setting time (sec) | Tensile shear strength (kg/cm²) | Stability (90° C., 5 days) |
|---|---|---|---|---|---|
| Reference Example 1 | ECA 100 | — | 7-10 | 90 | Good |
| Example 12 | ECA 93.3 | PhC 6.7 | 5-7 | 109 | Good |
| Example 13 | ECA 70.0 | EtC 30.0 | 3-5 | 90 | Good |
| Example 14 | ECA 70.0 | PhC 30.0 | 3-5 | 90 | Good |
| Example 15 | ECA 70.0 | MeC 30.0 | 3-5 | 78 | Good |
| Example 16 | ECA 70.0 | PC 30.0 | 5-7 | 70 | Good |
| Example 17 | ECA 70.0 | DGC 30.0 | 5-7 | 92 | Good |
| Example 18 | ECA 70.0 | PDC 30.0 | 5-7 | 95 | Good |
| Example 19 | ECA 70.0 | BDC 30.0 | 5-7 | 89 | Good |
| Example 20 | ECA 70.0 | TGC 30.0 | 5-7 | 91 | Good |

Note
1: ECA stands for ethyl 2-cyanoacrylate.
2: EC stands for ethylene carbonate.
3: PhC stands for diphenyl carbonate.
4: EtC stands for diethyl carbonate.
5: MeC stands for dimethyl carbonate.
6: PC stands for propylene carbonate.
7: DGC stands for diethylene glycol bis(allyl cabonate).
8: PDC stands for 1,3-propanediol bis(allyl carbonate).
9: BDC stands for 1,4-butanediol bis(allyl carbonate).
10: TGC stands for triethylene glycol bis(allyl carbonate).
11: In Example 16, methanesulfonic acid was added in an amount of 50 ppm.
12: The setting time and tensile shear strength were measured in the Fe face-to-Fe face mode.
13: The numerical values given under "Compound (A)" and "Compound (B)" indicate the mixing proportions (percent by weight).

EXAMPLES 21-43 AND REFERENCE EXAMPLES 2-8

Ethylene carbonate was incorporated, in various amounts, in various 2-cyanoacrylate compounds containing a small amount of sulfur dioxide (stabilizer). The conditions used and results obtained are shown in Table 3.

For comparison, the incorporation of ethylene carbonate was omitted in Reference Examples 2-8. The results obtained in these reference examples are also shown in Table 3.

TABLE 3

|  | Compound (A) | Compound (B) | Setting time (sec) | Tensile shear strength (kg/cm²) | Stability (90° C., 5 days) |
|---|---|---|---|---|---|
| Reference Example 2 | MCA 100 | — | 5-7 | 150 | Good |
| Example 21 | MCA 90 | EC 10 | 1-3 | 175 | Good |
| Example 22 | MCA 80 | EC 20 | 3-5 | 160 | Good |
| Example 23 | MCA 60 | EC 40 | 10-13 | 65 | Good |
| Reference Example 3 | ECA 100 | — | 7-10 | 90 | Good |
| Example 24 | ECA 85 | EC 15 | 3-5 | 115 | Good |
| Example 25 | ECA 70 | EC 30 | 5-7 | 72 | Good |
| Example 26 | ECA 50 | EC 50 | 15-20 | 40 | Good |
| Reference Example 4 | ACA 100 | — | 7-10 | 120 | Good |
| Example 27 | ACA 90 | EC 10 | 3-5 | 135 | Good |
| Example 28 | ACA 75 | EC 25 | 7-10 | 102 | Good |
| Example 29 | ACA 60 | EC 40 | 50-60 | 60 | Good |
| Reference Example 5 | PCA 100 | — | 10-13 | 90 | Good |
| Example 30 | PCA 85 | EC 15 | 5-7 | 110 | Good |
| Example 31 | PCA 70 | EC 30 | 10-13 | 81 | Good |
| Example 32 | PCA 50 | EC 50 | 60-70 | 35 | Good |
| Reference Example 6 | BCA 100 | — | 15-17 | 85 | Good |
| Example 33 | BCA 90 | EC 10 | 10-13 | 105 | Good |
| Example 34 | BCA 80 | EC 20 | 15-17 | 78 | Good |
| Example 35 | BCA 65 | EC 35 | 40-50 | 50 | Good |
| Reference Example 7 | EECA 100 | — | 20-25 | 85 | Good |
| Example 36 | EECA 95 | EC 5 | 15-17 | 92 | Good |
| Example 37 | EECA 70 | EC 30 | 25-30 | 65 | Good |
| Example 38 | EECA 40 | EC 60 | 120-140 | 20 | Good |
| Reference Example 8 | ECMC 100 | — | 40-45 | 110 | Good |
| Example 39 | ECMC 90 | EC 10 | 30-35 | 132 | Good |
| Example 40 | ECMC 80 | EC 20 | 45-50 | 105 | Good |
| Example 41 | ECMC 60 | EC 40 | 150-170 | 45 | Good |
| Reference Example 2 | MCA 100 | — | 5-7 | 150 | Good |
| Reference Example 3 | ECA 100 | — | 7-10 | 90 | Good |
| Reference Example 6 | BCA 100 | — | 15-17 | 85 | Good |
| Example 42 | MCA 40 ECA 40 | EC 20 | 3-5 | 123 | Good |
| Example 43 | ECA 60 BCA 20 | EC 20 | 5-7 | 100 | Good |

Note
1: MCA stands for methyl 2-cyanoacrylate.
2: ECA stands for ethyl 2-cyanoacrylate.
3: ACA stands for allyl 2-cyanoacrylate.
4: PCA stands for isopropyl 2-cyanoacrylate.
5: BCA stands for isobutyl 2-cyanoacrylate.
6: EECA stands for ethoxyethyl 2-cyanoacrylate.
7: ECMC stands for ethoxycarbonylmethyl 2-cyanoacrylate.
8: EC stands for ethylenecarbonate.
9: The setting time and tensile shear strength were measured in the Fe face-to-Fe face mode.
10: The numerical values given under "Compound (A)" and "Compound (B)" indicate the mixing proportions (percent by weight).

EXAMPLES 44-47 AND REFERENCE EXAMPLES 3, 9, AND 10

Ethylene carbonate was added, in various amounts, to ethyl 2-cyanoacrylate containing a small amount of sulfur dioxide. Simultaneously, moisture was caused to present in each system in a small amount because it was anticipated that such amount of moisture might invade into the container through the container vessel during a storage period of about one year. The conditions used and results obtained are shown in Table 4.

The results obtained above in Reference Example 3 are again shown in Table 4 for the case in which the addition of ethylene carbonate and of moisture was omitted. The results of Reference Examples 9 and 10 in which moisture was added but ethylene carbonate was not incorporated are also shown in Table 4.

TABLE 4

|  | Compound (A) | Compound (B) | Setting time (sec) | Tensile shear strength (kg/cm$^2$) | Stability (90° C., 5 days) |
|---|---|---|---|---|---|
| Reference Example 3 | ECA 100 | — | 7–10 4–6 | 90 | Good |
| Reference Example 9 | ECA* 100 | — | 10–13 5–7 | 80 | Good |
| Reference Example 10 | ECA* 100 DBP 40 | — | 7–10 10–13 | 120 | Good |
| Example 44 | ECA* 100 | EC 17.7 | 2–3 3–5 | 68 | Good |
| Example 45 | ECA* 100 | EC 25.0 | 2–3 3–5 | 90 | Good |
| Example 46 | ECA* 100 | EC 33.3 | 2–3 3–5 | 67 | Good |
| Example 47 | ECA* 100 | EC 42.9 | 2–3 3–5 | 75 | Good |

Note
1: The asterisk (*) indicates that water was added in an amount of 0.1%.
2: In Refernce Example 10, DBP (dibutyl phthalate) was added as a plasticizer.
3: ECA stands for ethyl 2-cyanoacrylate.
4: EC stands for ethylene carbonate.
5: The setting time and tensile shear strength were measured in the Fe face-to-Fe face mode.
6: The numerical values given under "Compound (A)" and "Compound (B)" indicate the mixing proportions (parts by weight).

EXAMPLE 48

To 100 parts (by weight; the same shall apply hereunder) of ethyl 2-cyanoacrylate was added 20 parts of γ-butyrolactone as an organic solvent, followed by addition of 30 parts of ethylene carbonate. After an admixing operation, a homogeneous solution was obtained.

The solution or composition showed a setting time of 20–25 seconds and a tensile shear strength of 51 kg/cm$^2$ and had good stability.

EXAMPLE 49

To 100 parts of ethyl 2-cyanoacrylate was added 10 parts of dibutyl phthalate as a plasticizer, followed by addition of 30 parts of ethylene carbonate. After admixing, a homogeneous solution was obtained.

The composition obtained showed a setting time of 7–10 seconds and a tensile shear strength of 83 kg/cm$^2$ and had good stability.

EXAMPLES 50–52

To 100 parts of ethyl 2-cyanoacrylate was added 20 parts of ethylene carbonate and, at the same time, 10 parts of the following ethylene-vinyl acetate copolymers (1) and (2) (The Nippon Synthetic chemical Industry Co., Ltd.) and 10 parts of the following ethylene-vinyl acetate copolymer (3) (Tokuyama Soda Co., Ltd.) were dissolved. The dissolution could be smoothly performed.

Through heat was evolved at dissolution, this heat was substantially offset by the endothermic effect of ethylene carbonate so that the temperature of the system remained substantially unchanged.

(1) An ethylene-vinyl acetate copolymer powder with a vinyl acetate content of 55% by weight and a melt index of 150 to 200 g/10 min.

(2) An ethylene-vinyl acetate copolymer powder with a vinyl acetate content of 70% by weight and a melt index of 40 to 50 g/10 min.

(3) An ethylene-vinyl acetate copolymer powder with a vinyl acetate content of 42% by weight and a melt index of 75 g/10 min.

REFERENCE EXAMPLES 12–14

An attempt was made to dissolve three ethylene-vinyl acetate copolymers, mentioned in Examples 50 to 52, in ethyl 2-cyanoacrylate without ethylene carbonate.

The polymers (1) and (2) could be anyhow dissolved but as heat was evolved at dissolution to cause a solidification of the system, it was very difficult to dissolve them without causing the solidification.

Regarding the polymer (3), phase separation occurred so that homogeneous dissolution was impossible. Therefore, the ethylene-vinyl acetate copolymer (3) was first dissolved in toluene and the solution was mixed with ethyl 2-cyanoacrylate. However, phase separation occurred again.

EXAMPLE 53

A flask was charged with 50 parts of ethyl 2-cyanoacrylate containing a small amount of sulfur dioxide (stabilizer), followed by addition of 50 parts of ethylene carbonate. When the flask was gently swirled, ethylene carbonate was smoothly dissolved in ethyl 2-cyanoacrylate to give a homogeneous solution.

This solution was very sticky and it retained tackiness even on rubbing it against the fingers several times. When iron pieces and other adherends were bonded with this solution, the adherends were initially kept joined by tackiness but subsequently bonded by adhesion and complete adhesion was attained after 24 hours.

What is claime is:

1. A 2-cyanoacrylate composition which comprises, (A) a 2-cyanoacrylate compound, and (B) a carbonate compound selected from the group consisting of di(hydrocarbyl) carbonates, alkylene carbonates, alkylne carbonates, alkylene glycol bisalkyl carbonates, trihydric alcohol trisalkyl carbonates, wherein the proportion of the carbonate compound (B) is 0.01–70% by weight based on the sum of the 2-cyanoacrylate compound (A) and the carbonate compound (B).

2. A composition as claimed in claim 1, wherein the proportion of the carbonate compound (B) is 0.5–65% by weight based on the sum of the 2-cyanoacrylate acrylate compound (A) and the carbonate compound (B).

3. A composition as claimed in claim 1, wherein the carbonate compound (B) is ethylene carbonate.

4. A composition as claimed in claim 1, said composition being an adhesive.

5. A composition as claimed in claim 4, said composition being an adhesive of the instantaneous cure type.

6. A composition as claimed in claim 5, wherein the proportion of the carbonate compound (B) is 0.01 to about 35% by weight based on the sum of the 2-cyanoacrylate compound (A) and the carbonate compound (B).

7. A composition as claimed in claim 4, said composition being an adhesive of the tacky type.

8. A composition as claimed in claim 7, wherein the proportion of the carbonate compound (B) is about 25–70% by weight based on the sum of the 2-cyanoacrylate compound (A) and the carbonate compound (B).

* * * * *